(12) United States Patent
Sanchez

(10) Patent No.: US 10,583,889 B1
(45) Date of Patent: Mar. 10, 2020

(54) AUXILIARY HANDLE BAR SYSTEM

(71) Applicant: Frank G. Sanchez, Albuquerque, NM (US)

(72) Inventor: Frank G. Sanchez, Albuquerque, NM (US)

( * ) Notice: Subject to any disclaimer, the term of this patent is extended or adjusted under 35 U.S.C. 154(b) by 0 days.

(21) Appl. No.: 16/408,812

(22) Filed: May 10, 2019

(51) Int. Cl.
B62K 21/12 (2006.01)
(52) U.S. Cl.
CPC ................................ B62K 21/125 (2013.01)
(58) Field of Classification Search
CPC ...... B62K 21/125; B62K 21/12; B62K 21/26; B62K 21/16; B62K 11/14; B62K 19/30; B62K 19/32; B62K 19/40
See application file for complete search history.

(56) References Cited

U.S. PATENT DOCUMENTS

| | | | |
|---|---|---|---|
| 4,794,815 A | 1/1989 | Borromeo | |
| 5,145,210 A * | 9/1992 | Lennon | B62K 21/125 280/261 |
| 5,163,339 A | 11/1992 | Giard, Jr. et al. | |
| 5,425,285 A | 6/1995 | Cheng | |
| 5,429,013 A | 7/1995 | Taylor et al. | |
| 5,983,747 A | 11/1999 | Chen | |
| 6,263,759 B1 | 7/2001 | Hollingsworth et al. | |
| D658,098 S | 4/2012 | Plainfield | |
| 8,359,713 B1 | 1/2013 | Chen | |
| 9,511,814 B2 | 12/2016 | Harvey | |
| D782,897 S | 4/2017 | Harvey | |
| 2012/0255391 A1 * | 10/2012 | Gueugneaud | B62K 21/12 74/551.1 |

FOREIGN PATENT DOCUMENTS

| | | | | |
|---|---|---|---|---|
| DE | 4336485 A1 * | 6/1994 | ........... | B62K 21/125 |
| KR | 101954879 B1 * | 3/2019 | ............ | B62K 21/16 |

OTHER PUBLICATIONS

Machine Translation of DE 4336485, obtained Sep. 9, 2019.*
Machine Translation of KR 101954879, obtained Sep. 9, 2019.*

* cited by examiner

Primary Examiner — Richard W Ridley
Assistant Examiner — Brian J McGovern
(74) Attorney, Agent, or Firm — Cramer Patent & Design, PLLC

(57) ABSTRACT

An auxiliary handle bar system includes a pair of handle bars, each secured beneath a bicycle handle bar.

14 Claims, 4 Drawing Sheets

AUXILIARY HANDLE BAR SYSTEM

RELATED APPLICATIONS

None.

FIELD OF THE INVENTION

The present invention relates generally to the field of handle bars and specifically to an auxiliary handle bar system.

BACKGROUND OF THE INVENTION

A modem bicycle relies on high-tech materials and design to allow the rider to go faster while expending less energy. Composite materials, low-profile tires, trip computers, and complex gearing systems are testaments to this. However, one aspect of the bicycle riding experience which is difficult to change is the rider themselves.

The aerodynamic impact of the rider is order of magnitudes more when compared to the bicycle itself. Streamlined helmets and even specially designed clothing offer to help, but the greatest impact is usually from the position of the rider on the bicycle. Anything that can reduce the aerodynamic impact of the rider will allow for higher speeds and lower energy output. Accordingly, there exists a need for a means by which the position of the rider on a bicycle can be modified to improve aerodynamic performance. The development of the auxiliary handle bar fulfills this need.

SUMMARY OF THE INVENTION

The principles of the present invention provide for an auxiliary handle grip, comprises a left-hand assembly which is joined to a first horizontal member by use of a first clamp with a first fastener. The left-hand assembly has a plurality of first tubular elements. The first horizontal member is covered with a first grip enhancing covering to increase friction between the first horizontal member and a rider's left hand thus enhancing the grip and preventing slippage. The grip also comprises a right-hand assembly which is joined to a second horizontal member by use of a second clamp with a second fastener. The right-hand assembly has a plurality of second tubular elements. The second horizontal member is covered with a second grip enhancing covering to increase friction between the second horizontal member and a rider's right hand thus enhancing the second grip and preventing slippage. Both the left-hand assembly and the right-hand assembly are attached to a handlebar by use of a split clamp which includes a forward half and an aft half joined by a plurality of third fasteners.

The grip also comprises a left vertical member which is joined to the forward half of the split clamp by use of a fourth clamp and an associated fourth fastener and a right vertical member which is joined to the forward half of the split clamp by use of a fifth clamp and an associated fifth fastener. The left-hand assembly and the right-hand assembly are installed upon the left-hand and right-hand sides of the handlebar, respectively, close to a stem providing the rider with an additional grip area for the handlebar.

The first fastener may be selected from the group consisting of a screw, a nut, or a bolt. The first tubular elements may be made of material selected from the group consisting of steel, aluminum, titanium, or carbon fiber. Additionally, the first grip enhancing covering may be made of foam padding or tape.

The first grip enhancing covering may increase an overall diameter to suit the rider's left hand on a customized basis and may provide for enhanced comfort during long periods of riding. The right-hand assembly may be a mirror image of the left-hand assembly but otherwise are identical.

The second tubular elements may be made of material selected from the group consisting of steel, aluminum, titanium, or carbon fiber.

The second fastener may be selected from the group consisting of a screw, a nut, or a bolt. The second grip enhancing covering may be made of foam padding or of tape. The second grip enhancing covering may increase an overall diameter to suit the rider's right hand on a customized basis or provide enhanced comfort during long periods of riding. The third fasteners may be selected from the group consisting of a plurality of screws, a plurality of nuts, or a plurality of bolts. The split clamp by use of the fourth clamp may include a rounded terminal end so as to limit or remove any inadvertent snagging or piercing of equipment, apparel, or skin of a rider. The clamp rounded terminal end may be modified to terminate coextensively with the upper terminal end of the split clamp to minimize or eliminate any snagging or inadvertent impalement.

The fourth fastener may be a millimeter bolt with an Allen-type socket to maximize security of the split clamp and so that a head of the fourth fastener is countersunk and does not stick out. The split clamp by use of the fifth clamp may include a rounded terminal end so as to limit or remove any inadvertent snagging or piercing of equipment, apparel, or skin of a rider.

The fifth clamp rounded terminal end is modified to terminate coextensively with the upper terminal end of the split clamp to minimize or eliminate any snagging or inadvertent impalement and the fifth fastener may be a millimeter bolt with an Allen-type socket to maximize security of the split clamp and so that a head of the fifth fastener is countersunk and does not stick out.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
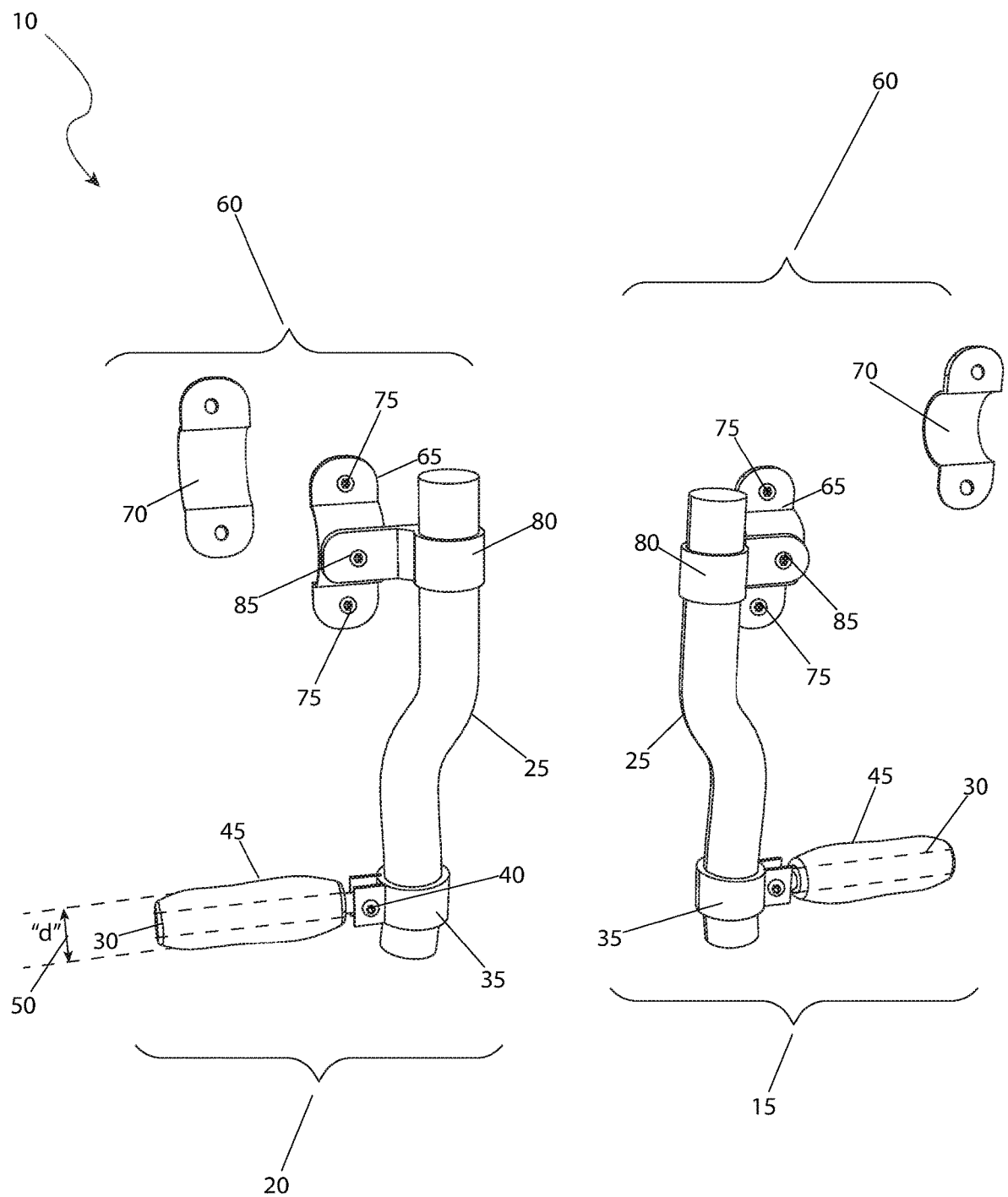
FIG. 1 is a front view of the auxiliary handle grip 10, according to the preferred embodiment of the present invention.

DESCRIPTIVE KEY 10 auxiliary handle grip
15 left hand assembly
20 right hand assembly
25 vertical member
30 horizontal member
35 first clamp
40 first fastener 45 grip enhancing covering
50 diameter "d"
55 handlebar
60 split clamp
65 forward half
70 aft half
75 second fastener
80 second clamp
85 third fastener
90 bicycle
95 stem
100 conventional handlebar grip area
105 rider
110 hand
115 arm
120 lowered body position
125 shoulder

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a front view of the auxiliary handle grip 10, according to the preferred embodiment of the present invention is disclosed. The auxiliary handle grip (herein also described as the "system") 10, mounts to the handlebar of a conventional racing bicycle. The system 10 includes a left-hand assembly 15 and a right-hand assembly 20 which are a mirror image of each other, but otherwise identical. The following disclosure will identify components that are present in both assemblies. The left-hand assembly 15 and the right-hand assembly 20 are envisioned to include tubular elements made of material such as steel, aluminum, titanium, carbon fiber, or the like. The material of construction is not intended to be a limiting factor of the present invention.

The left-hand assembly 15 is joined to a horizontal member 30 by use of a clamp 35 with a fastener 40 such as screw, nut, and/or bolt. The right-hand assembly 20 is joined to a horizontal member 30 by use of a clamp 35 with a fastener 40 such as screw, nut, and/or bolt. The horizontal member 30 is covered with a grip enhancing covering 45 such as foam padding, tape, or the like. The grip enhancing covering 45 is envisioned to increase friction between the horizontal member 30 and the rider's hand thus enhancing the grip and preventing slippage. It is also envisioned that the grip enhancing covering 45 will increase the overall diameter "d" 50 to suit the size of the rider's hand on a customized basis. The grip enhancing covering 45 provides for enhanced comfort during long periods of riding.

Both the left-hand assembly 15 and the right-hand assembly 20 are attached to the handlebar 55 (not shown in this figure) by use of a split clamp 60 including a forward half 65 and an aft half 70 joined by second fasteners 75 such a screw, nut, and/or bolt. To complete the assembly, the vertical member 25 is joined to the forward half 65 of the split clamp 60 by use of a second clamp 80 and associated third fastener 85 such as screw, nut, and/or bolt. It is envisioned that the system 10 could be used on any type, size, style, or diameter of handlebar 55 (not shown in this FIGURE) by the self-adjusting nature of the split clamp 60. It is appreciated that the split clamp 60 of both assemblies 15, 20 have rounded terminal ends so as to limit or remove any inadvertent snagging or piercing of equipment, apparel, or skin of a rider 105. It is also appreciated that any type of fastener 75 can be used, it is preferred that a millimeter bolt with an Allen-type socket is best suited to maximize the security of the split clamp 60 and so that the head of the fastener 75 is countersunk and does not stick out. Also, the upper terminal end of the vertical member 25 as it protrudes out of the split clamp 60 on both assemblies 15, 20 may be modified to terminate coextensively with the upper terminal end of the split clamp 60 to minimize or eliminate any snagging or inadvertent impalement.

Figure 2:
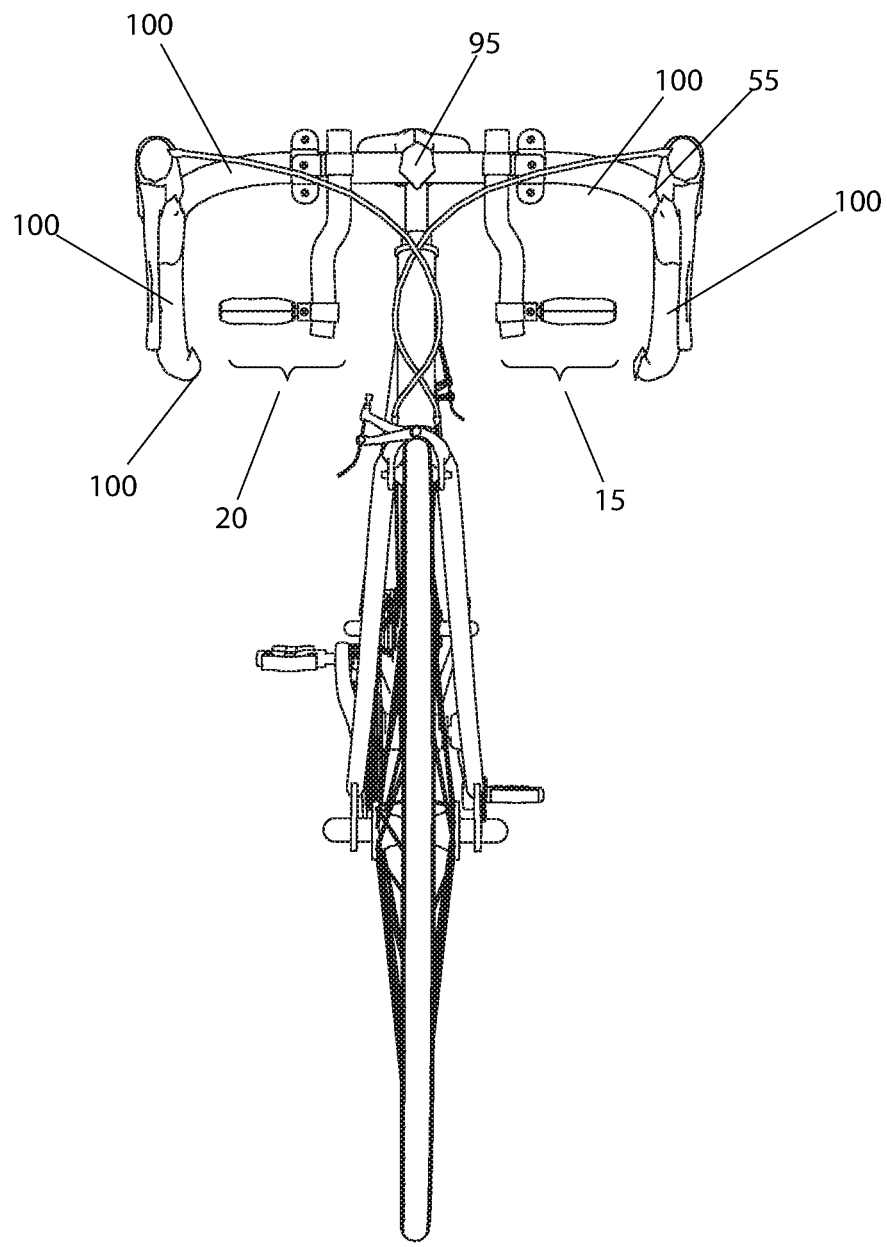
FIG. 2 is a front view of the auxiliary handle grip 10, shown in an installed state on a bicycle 90, according to the preferred embodiment of the present invention.

Referring next to FIG. 2, a front view of the system 10, shown in an installed state on a bicycle 90, according to the preferred embodiment of the present invention is depicted. The left-hand assembly 15 and the right-hand assembly 20 are installed upon the left-hand and right-hand sides of the handlebar 55, respectively, close to the stem 95. This location provides the rider 105 with an additional grip area for the handlebar 55 in addition to other conventional handlebar grip areas 100. This position is lower and closer to the stem 95 than others and as such, decreases the rider's aerodynamic profile as will be shown herein below. This position of the system 10 does not interfere with the operation or steering of the bicycle 90, and do not protrude from the bicycle 90 so as to cause interference with other riders in nearby proximity.

Figure 3:
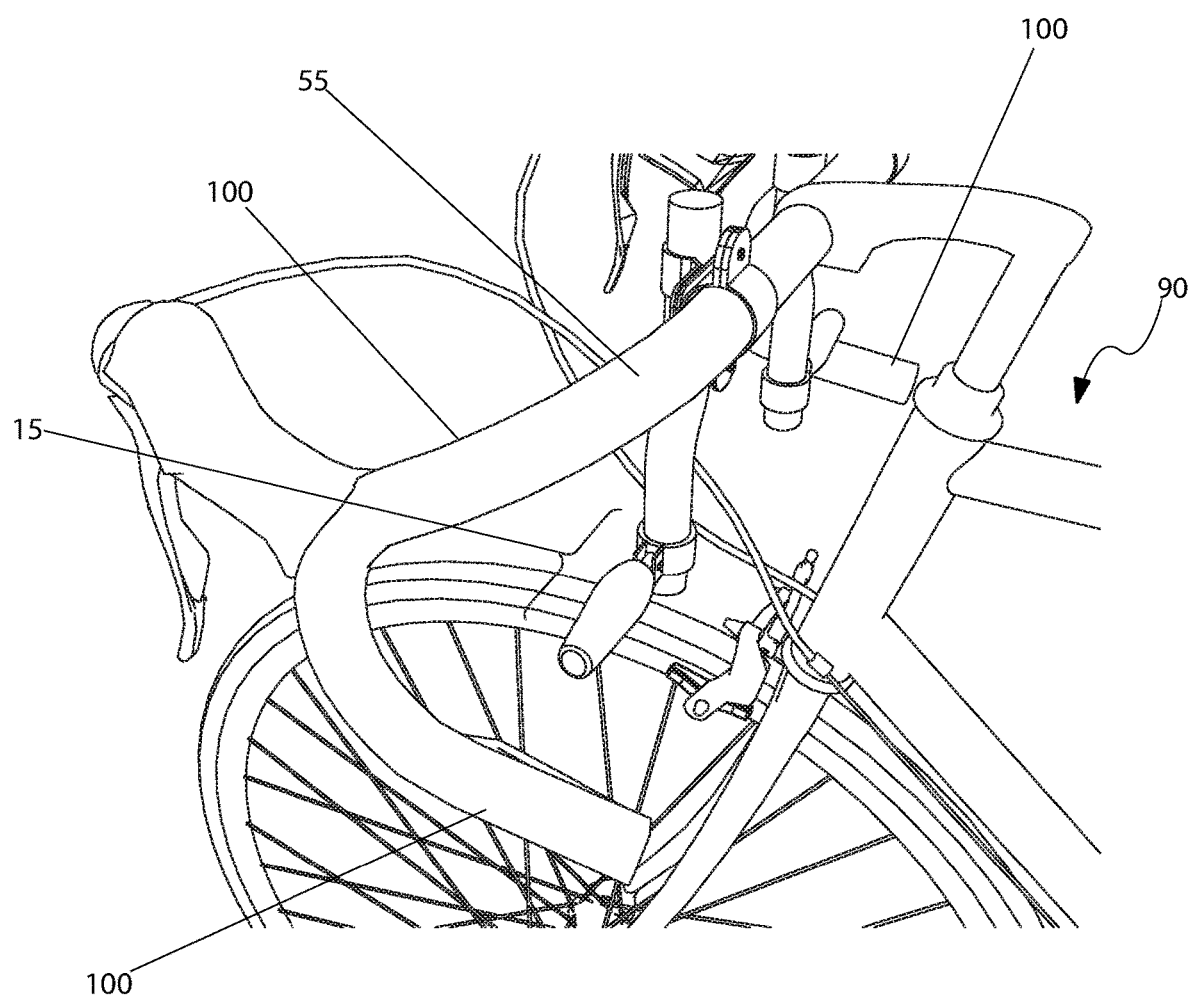
FIG. 3 is a side view of the auxiliary handle grip 10, shown in an installed state on a bicycle 90 according to the preferred embodiment of the present invention; and, FIG. 4 is a perspective view of the auxiliary handle grip 10, shown in a utilized state while riding, according to the preferred embodiment of the present invention.

Referring now to FIG. 3, a side view of the system 10, shown in an installed state on a bicycle 90 according to the preferred embodiment of the present invention is shown. This view clearly discloses the in-line arrangement of the left-hand assembly 15. The right-hand assembly 20 is not readily visible in this figure, due to illustrative limitations. The system 10 provides for generally the same control axis as the other conventional handlebar grip areas 100.

Figure 4:
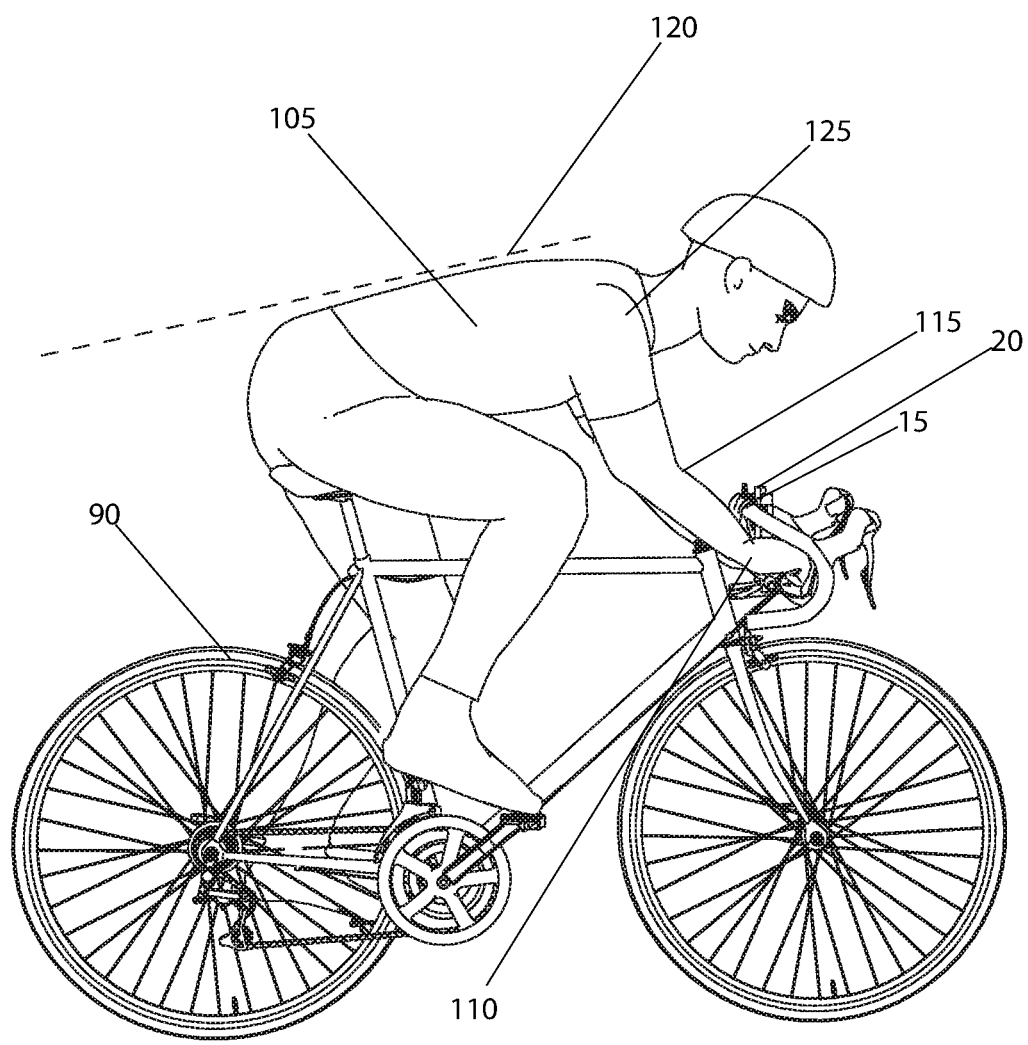

Referring to FIG. 4, a perspective view of the system 10, shown in a utilized state while riding, according to the preferred embodiment of the present invention is disclosed. This view provides knowledge of the decreased aerodynamic properties of the rider 105 as the hands 110 and arms 115 are placed on the right-hand assembly 20 and the left-hand assembly 15 (not visible due to illustrative limitations). This position provides for a lowered body position 120 and a more inside position of the arms 115 and shoulders 125 of the rider 105 thus decreasing the profile along two (2) axes. As such, faster speeds and/or longer pedaling time can be experience by the rider 105 with reduced energy output. Additionally, the energy (measured in wattage or horsepower) is effectively increased. It is envisioned that on flat, smooth terrain, the use of the system 10 will provided an increase of four to six miles per hour (4-6 mph). This position is conducive to "pull" on the system 10 allowing for an effective increase in speed through a more effective usage of a higher gear ratio.

2. OPERATION OF THE PREFERRED EMBODIMENT

The preferred embodiment of the present invention can be utilized by the common user in a simple and effortless manner with little or no training. It is envisioned that the system 10 would be constructed in general accordance with FIG. 1 through FIG. 4. The user would procure the system 10 either as part of a new bicycle 90 or as an add-on component for installation on an existing bicycle 90. Special attention would be given to color, size, type of grip enhancing covering 45 and the like. Procurement in either case would be through a bicycle shop, sporting goods store, mail order store or the like.

After procurement, the system 10 would be installed on an existing bicycle 90 in the following manner: the horizontal member 30 would be lightly secured to the vertical member 25 by use of the first clamp 35; the split clamp 60 would be attached to one (1) side of the handlebar 55 by use of the forward half 65, the aft half 70 and the second fasteners 75; the vertical member 25 would be attached to the forward half 65 by use of the third fastener 85; initial fitting with the rider 105 on the bicycle 90 in a riding position would be finalized; the first fastener 40, the second fasteners 75 and the third fastener 85; tightened; the grip enhancing covering 45 would be applied to the horizontal member 30; and the process repeated with the opposite side of the handlebar 55. At this point in time the system 10 is ready for use.

During utilization of the system 10, the following procedure would be initiated: the rider 105 may use any conventional handlebar grip areas 100, or the two (2) horizontal member 30 depending on the riding action being performed. It is envisioned that the system 10 would be useful in situations where speed is important, decreased wind resistance is important, or rear vision access is needed where the user can more easily turn their upper body and still regain control of the bicycle 90.

It is envisioned that the system 10 would remain permanently attached to the bicycle 90. It may also be easily removed and utilized on another bicycle 90 should the need arise.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An auxiliary handle grip, comprising:
a left-hand assembly joined to a first horizontal member by use of a first clamp with a first fastener, the first horizontal member is covered with a first grip enhancing covering to increase friction between the first horizontal member and a rider and a rider's left hand thus enhancing the first grip and preventing slippage;
a right-hand assembly joined to a second horizontal member by use of a second clamp with a second fastener, the second horizontal member is covered with a second grip enhancing covering to increase friction between the second horizontal member and the rider and a rider's right hand thus enhancing the second grip and preventing slippage,
the left-hand assembly and the right-hand assembly are each attached to a handlebar by use of a split clamp, each of the split clamps includes a forward half and an aft half joined by a third fastener;
a left vertical member joined to the forward half of the split clamp of the left-hand assembly by use of a fourth clamp and an associated fourth fastener;
a right vertical member joined to the forward half of the split clamp of the right-hand assembly by use of a fifth clamp and an associated fifth fastener; and
wherein the fourth clamp includes a rounded terminal end so as to limit or remove any inadvertent snagging or piercing of equipment, apparel, or skin of the rider;
the fourth fastener extends through the rounded terminal end of the fourth clamp and is received by the forward half of the split clamp of the left-hand assembly.

2. The auxiliary handle grip according to claim 1, wherein the first fastener is selected from the group consisting of a screw, a nut, or a bolt.

3. The auxiliary handle grip according to claim 1, wherein at least one of the first horizontal member, the second horizontal member, the left vertical member, and the right vertical member is made of material selected from the group consisting of steel, aluminum, titanium, or carbon fiber.

4. The auxiliary handle grip according to claim 1, wherein at least one of the first grip enhancing covering and the second grip enhancing covering is made of foam padding.

5. The auxiliary handle grip according to claim 1, wherein the first grip enhancing covering is made of tape.

6. The auxiliary handle grip according to claim 1, wherein the first grip enhancing covering increases an overall diameter to suit the rider's left hand on a customized basis.

7. The auxiliary handle grip according to claim 1, wherein the right-hand assembly is a mirror image of the left-hand assembly but otherwise is identical.

8. The auxiliary handle grip according to claim 1, wherein the second fastener is selected from the group consisting of a screw, a nut, or a bolt.

9. The auxiliary handle grip according to claim 1, wherein the second grip enhancing covering is made of tape.

10. The auxiliary handle grip according to claim 1, wherein the second grip enhancing covering increases an overall diameter to suit the rider's right hand on a customized basis.

11. The auxiliary handle grip according to claim 1, wherein the third fasteners are selected from the group consisting of a plurality of screws, a plurality of nuts, or a plurality of bolts.

12. The auxiliary handle grip according to claim 1, wherein the fourth fastener is a millimeter bolt with an Allen socket to maximize security of the split clamp of the left-hand assembly and so that a head of the fourth fastener is countersunk and does not stick out.

13. The auxiliary handle grip according to claim 1, wherein the fifth clamp includes a rounded terminal end so as to limit or remove any inadvertent snagging or piercing of equipment, apparel, or skin of the rider.

14. The auxiliary handle grip according to claim 13, wherein the fifth fastener is a millimeter bolt with an Allen socket to maximize security of the split clamp of the right-hand assembly and so that a head of the fifth fastener is countersunk and does not stick out.

* * * * *